(12) United States Patent
Baladi et al.

(10) Patent No.: US 9,957,900 B2
(45) Date of Patent: May 1, 2018

(54) SYSTEM AND METHOD FOR FLOW CONTROL IN TURBINE

(71) Applicant: General Electric Company, Schenectady, NY (US)

(72) Inventors: Mehdi Milani Baladi, Evandale, OH (US); Edward Michael Yanosik, Jr., Liberty Township, OH (US); Richard Bradford Hook, Jr., West Chester, OH (US); Scott Edward Farley, Kings Mills, OH (US); Gordon Jeffery Follin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 603 days.

(21) Appl. No.: 14/709,343

(22) Filed: May 11, 2015

(65) Prior Publication Data

US 2016/0333794 A1 Nov. 17, 2016

(51) Int. Cl.
*F01D 17/14* (2006.01)
*F02C 9/18* (2006.01)
(Continued)

(52) U.S. Cl.
CPC ............... *F02C 9/18* (2013.01); *F01D 5/145* (2013.01); *F01D 5/148* (2013.01); *F01D 17/14* (2013.01);
(Continued)

(58) Field of Classification Search
CPC ...... F02C 9/18; F02C 3/04; F02C 9/20; F01D 5/145; F01D 5/148; F01D 17/14;
(Continued)

(56) References Cited

U.S. PATENT DOCUMENTS 2,885,856 A * 5/1959 Pedersen ................. F01D 5/148
415/116
3,403,890 A 10/1968 Barber
(Continued)

FOREIGN PATENT DOCUMENTS

EP 2072756 A2 6/2009
EP 2481885 A1 8/2012
(Continued)

OTHER PUBLICATIONS

U.S. Appl. No. 14/707,927, filed May 8, 2015, Mehdi Milani Baladi.
(Continued)

*Primary Examiner* — Richard Edgar
(74) *Attorney, Agent, or Firm* — Fletcher Yoder, P.C.

(57) ABSTRACT

One embodiment of the present discloses includes a system. The system includes a turbine and a fluid supply system. The turbine includes a main flow path, a plurality of turbine blades disposed along the main flow path, at least one flow control area disposed along the main flow path, and at least one fluid injection port fluidly coupled to the main flow path. The fluid supply system is fluidly coupled to the at least one fluid injection port, wherein the fluid supply system is configured to supply a fluid to the at least one fluid injection port to adjust an effective area of the at least one flow control area.

20 Claims, 6 Drawing Sheets

(51) Int. Cl.
*F02C 3/04* (2006.01)
*F01D 5/14* (2006.01)
*F02K 1/30* (2006.01)
*F02C 9/20* (2006.01)
*F15D 1/00* (2006.01)

(52) U.S. Cl.
CPC .............. *F02C 3/04* (2013.01); *F02C 9/20* (2013.01); *F02K 1/30* (2013.01); *F15D 1/008* (2013.01); *F05D 2220/32* (2013.01); *F05D 2260/16* (2013.01); *F05D 2260/202* (2013.01); *Y02T 50/673* (2013.01); *Y02T 50/675* (2013.01)

(58) Field of Classification Search
CPC ... F01D 9/06; F02K 1/30; F15D 1/008; F05D 2220/32; F05D 2260/16; F05D 2260/202; Y02T 50/673; Y02T 50/675
See application file for complete search history.

(56) References Cited

U.S. PATENT DOCUMENTS

| | | | |
|---|---|---|---|
| 4,660,376 A * | 4/1987 | Johnson | F01K 21/047 60/39.53 |
| 6,968,698 B2 * | 11/2005 | Walsh | F02C 3/305 60/39.3 |
| 7,886,520 B2 | 2/2011 | Stretton et al. | |
| 8,113,769 B2 | 2/2012 | Takahashi et al. | |
| 8,161,754 B2 | 4/2012 | Sheaf et al. | |
| 8,276,364 B2 | 10/2012 | Levasseur | |
| 8,418,471 B2 | 4/2013 | Baltas | |
| 8,453,458 B2 | 6/2013 | Whurr et al. | |
| 8,601,822 B2 | 12/2013 | Paradise | |
| 8,669,670 B2 | 3/2014 | Donnelly et al. | |
| 8,720,182 B2 | 5/2014 | Jain | |
| 8,726,629 B2 | 5/2014 | Coney | |
| 8,794,008 B2 | 8/2014 | Eroglu et al. | |

FOREIGN PATENT DOCUMENTS

| | | |
|---|---|---|
| GB | 750618 A | 6/1956 |
| GB | 2106191 A | 4/1983 |

OTHER PUBLICATIONS

European Search Report and Opinion issued in connection with corresponding EP Application No. 16168467.5 dated Oct. 27, 2016.

\* cited by examiner

SYSTEM AND METHOD FOR FLOW CONTROL IN TURBINE

BACKGROUND OF THE INVENTION

The subject matter disclosed herein relates to turbine systems, and more specifically flow control in gas turbine systems.

Turbine systems generally include a turbine with one or more stages of turbine blades, which are driven by a working fluid. For example, gas turbine systems are driven by combustion gases from one or more combustors. Gas turbine systems also may include a compressor to generate compressed air, which facilitates combustion of fuel in the combustors. In certain applications, one or more movable structures may be used to physically change a geometry of a flow path through the gas turbine system (e.g., exhaust flow path through turbine), thereby helping to control the pressure and/or flow through the gas turbine system. Unfortunately, the movable structures may be susceptible to thermal stress, wear, and/or degradation over time. The movable structures also may complicate the design of the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine and a fluid supply system. The turbine includes a main flow path, a plurality of turbine blades disposed along the main flow path, at least one flow control area disposed along the main flow path, and at least one fluid injection port fluidly coupled to the main flow path. The fluid supply system is fluidly coupled to the at least one fluid injection port, wherein the fluid supply system is configured to supply a fluid to the at least one fluid injection port to adjust an effective area of the at least one flow control area.

In a second embodiment, a system includes a controller. The controller includes memory storing instructions to control a supply of a fluid from a fluid supply system to at least one fluid injection port fluidly coupled to at least one flow control area along a main flow path of a turbine. In addition, the controller has instructions to adjust the supply of the fluid to adjust the effective area to vary a flow of working fluid through the at least one flow control area of the main flow path.

In a third embodiment, a method includes flowing a working fluid along a main flow path through a turbine to drive a plurality of turbine blades disposed along the main flow path. The method also includes supplying fluid from a fluid supply system to at least one fluid injection port fluidly coupled to the main flow path. The method also includes controlling the supply of the fluid to the at least one fluid injection port to adjust an effective area of the at least one flow control area.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate to flow control in a turbine section of a turbine engine, such as a gas turbine engine. In particular, the disclosed embodiments relate to flow control using fluid injection rather than a variable geometry achieved by movable structures (e.g., movable vanes) in a main flow path through the turbine section. The fluid injection simulates actual geometrical changes in the main flow path, but without actually changing the geometry of the main flow path. For example, the disclosed embodiments include a fluid-actuated variable flow control system having one or more fluid-actuated variable flow control areas (e.g., fluid-actuated variable area turbine nozzle), which receive an injection of an external fluid (e.g., air, steam, carbon dioxide, or inert gas) to control (e.g., increase or decrease) an effective area for passage of hot combustion gases through a turbine. The fluid injection may be provided through one or more walls defining boundaries of the main flow path of combustion gases through the turbine section, one or more turbine nozzles and/or stator vanes, one or more struts, a wall disposed about the main flow path of combustion gases, a shroud disposed above a turbine blade, any stationary (e.g., non-rotating) surface along the main flow path of combustion gases, or any combination thereof. The fluid injection may be increased to reduce or constrict the flow of combustion gases through the main flow path, while the fluid injection may be decreased to increase the flow of combustion gases through the main flow path.

Figure 1:
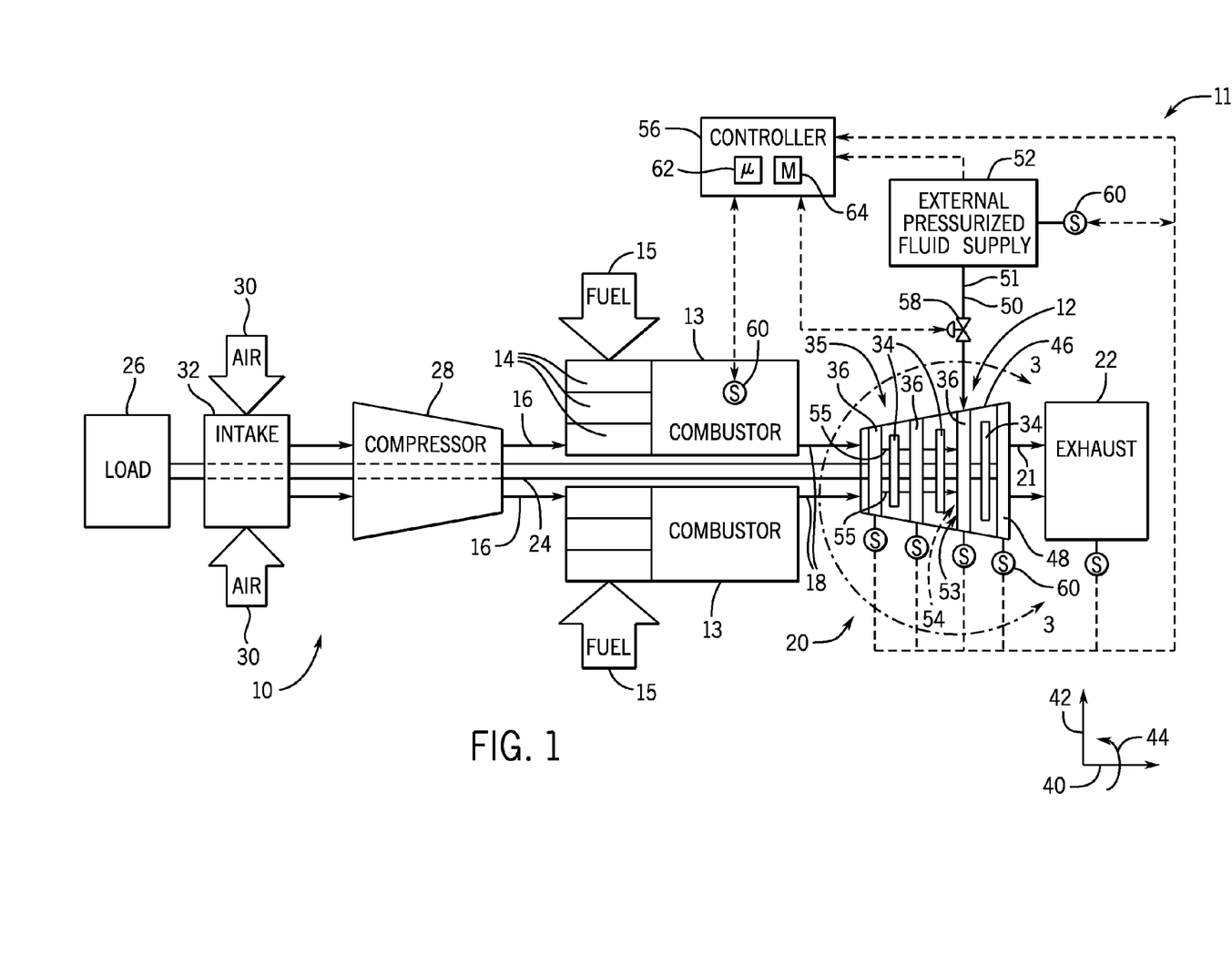
FIG. 1 is a schematic view of an embodiment of a gas turbine system having a turbine equipped with one or more blades, one or more stator vanes, and an external fluid supply.

Turning now to the drawings, FIG. 1 illustrates a block diagram of an embodiment of a gas turbine system 10 having a fluid-actuated variable flow control system 11 having one or more fluid-actuated variable flow control areas or flow control passages 12 (e.g., fluid-actuated variable area turbine nozzle). As described in detail below, the disclosed gas turbine system 10 (e.g., a gas turbine engine) may include a combustor section having one or more combustors 13, wherein each of the combustors 13 includes one or more fuel nozzles 14 that mix a fuel 15 with compressed air 16. Although the following discussion refers to compressed air 16, the gas turbine system 10 may operate with any suitable oxidant 16, such as air, oxygen, oxygen-enriched air, or oxygen-reduced air. The gas turbine system 10 may use liquid or gas fuel 15, such as natural gas and/or a hydrogen rich synthetic gas, to drive the gas turbine system 10. As depicted, the one or more fuel nozzles 14 intake the fuel 15, mix the fuel 15 with compressed air 16, and distribute the air-fuel mixture into the combustors 13 in a suitable ratio for combustion. The air-fuel mixture combusts within the combustors 13, thereby creating hot pressurized combustion gases 18 (e.g., exhaust gases 18). The combustors 13 direct the combustion gases 18 through a turbine section or turbine 20, and discharges the combustion gases 18 as an exhaust gas 21 through an exhaust section 22 (e.g., exhaust conduit). As the combustion gases 18 pass through the turbine 20, the combustion gases 18 force turbine blades 34 to rotate a shaft 24 along an axis of the gas turbine system 10. As illustrated, the shaft 24 may be connected to various components of the gas turbine system 10, including a load 26. The load 26 may be a part of a vehicle or a stationary load, such as a propeller on an aircraft or an electrical generator in a power plant, for example. The load 26 may include any suitable device capable of being powered by the rotational output of the gas turbine system 10. The shaft 24 may also be connected to the compressor 28. The compressor 28 also includes blades coupled to the shaft 24. As the shaft 24 rotates, the blades within the compressor 28 also rotate, thereby compressing air 30 from an air intake 32 through the compressor 28 and routing the compressed air 16 into the fuel nozzles 14 and/or combustor 13.

In certain embodiments, the turbine 20 may include one or more turbine stages 38 (e.g., 1, 2, 3, 4, 5, 6, 7, 8, 9, 10, or more stages), each stage 38 having a plurality of turbine blades 34 and a turbine nozzle 35 having a plurality of stator vanes 36 (e.g., gas turbine nozzle). The turbine stages 38 are spaced one after another along an axial direction 40. In the following discussion, reference may be made to the axial direction or axis 40 (e.g., a longitudinal axis) of the gas turbine system 10, a radial direction or axis 42 of the gas turbine system 10, and a circumferential direction or axis 44 of the gas turbine system 10. Additionally, each turbine blade 34 may be removably coupled to the drive shaft 24 and may rotate about the longitudinal axis 40 in the circumferential direction 44 during operation of the turbine 20. Each stator vane 36 may be removably coupled to, and/or supported by, stator (e.g., stationary) components of the turbine 20, such as a turbine casing 46, and generally do not rotate about the longitudinal axis 26. In certain embodiments, one or more stationary struts 48 (e.g., 1, 2, 3, 4, 5, or more) may be disposed between the turbine 20 and the exhaust section 22. The stationary strut 48 may provide structural support along the transition between the turbine 20 and the exhaust section 22, thereby allowing the hot combustion gases 18 to transition smoothly from the turbine 20 to the exhaust section 22.

In the disclosed embodiments, the fluid-actuated variable flow control system 11 is configured to selectively supply a pressurized fluid 50 from an external pressurized fluid supply 52 and into the fluid-actuated variable flow control area 12 along a main flow path 55 of combustion gases 18 through the turbine 20, wherein the turbine blades 34 are driven by the combustion gases 18 in the main flow path 55. The flow control area 12 (or flow control passage) of the turbine 20 has an actual or physical open flow area 53 (hereinafter "actual area") along the main flow path 55 of the combustion gases 18 at, upstream, and/or downstream relative to the turbine blades 34 and the stator vanes 36. The actual area 53 may be defined as an actual cross-sectional area, passage, space, or cavity along the main flow path 55. The flow control area 12 also has, in response to the injection of the pressurized fluid 50, a simulated or effective open flow area 54 (hereinafter "effective area"), which may be described as simulating a physical change in the geometry or actual open flow area for the passage of combustion gases 18. In other words, the injection of the pressurized fluid 50 may simulate the actual geometrical changes associated with use of movable structures (e.g., vanes) along the main flow path 55, but without actually changing the actual geometry of the main flow path 55. For example, if the fluid-actuated variable flow control system 11 selectively increases the supply of pressurized fluid 50 into the flow control area 12, then the increase in pressure and flow associated with the pressurized fluid 50 will cause a decrease in the effective area 54 relative to the actual area 53, thereby restricting or decreasing the flow of combustion gases 18 through the flow control area 12. If the fluid-actuated variable flow control system 11 selectively decreases the supply of pressurized fluid 50 into the flow control area 12, then the decrease in pressure and flow associated with the pressurized fluid 50 will cause an increase in the effective area 54, thereby increasing the flow of combustion gases 18 through the flow control area 12.

As discussed in further detail below, the fluid-actuated variable flow control system 11 is configured to selectively supply the pressurized fluid 50 into the flow control area 12 through one or more fluid injection ports disposed along an outer wall (e.g., turbine casing and/or shroud segments) surrounding the main flow path 55, an inner wall or hub along the main flow path 55, or along one or more radial structures (e.g., stator vanes 36 and/or struts 48) in each turbine nozzle 35. For example, the fluid injection ports may be arranged throughout each turbine nozzle 35 between adjacent stages 38 of turbine blades 34 in the turbine 20. The fluid injection ports enable the fluid-actuated variable flow control system 11 to modulate and adjust the effective area 54 of the flow control area 12.

The external pressurized fluid supply 52 may be disposed external to the turbine 20. In certain embodiments, the pressurized fluid 50 of the external pressurized fluid supply 52 may be any high-pressure fluid that may be provided from other components of the gas turbine system 10 or provided from external systems or processes. In some embodiments, the pressurized fluid 50 may be composed of one or more different types of high pressure fluids derived from external systems or processes. The pressurized fluid 50 may include steam, air (e.g., compressed air), inert gas (e.g., nitrogen, argon, helium, neon, krypton, or xenon), carbon dioxide, or other high pressure external fluid, or any combination thereof. Thus, the external pressurized fluid supply 52 may include an air supply, a steam supply, an inert gas supply, a carbon dioxide supply, or a combination thereof. For example, the pressurized fluid 50 (e.g., steam, inert gas, or carbon dioxide) may be generated by and/or routed from a reactor, gasifier, a syngas cooler, a gas treatment system (e.g., acid gas removal unit), a heat recovery system (e.g., heat recovery steam generator [HRSG]), a boiler, an air separation unit (ASU), a liquefaction system, or any other external systems or processes. In any of these systems, steam may be generated as the pressurized fluid 50 using heat (e.g., waste heat) to vaporize water, such as by using heat from a chemical reaction, gasification, combustion, or other heat transfer with plant equipment. The inert gas (e.g., nitrogen or argon) may be generated by the ASU, which includes cryogenic distillation equipment to separate air into oxygen, nitrogen, and argon. The pressurized fluid 50 (e.g., inert gas such as helium) also may be generated by the liquefaction system, such as a liquefied natural gas (LNG) system using liquefaction equipment to remove helium.

In certain embodiments, the external pressurized fluid supply 52 may receive any fluid, and may be configured to pressurize the fluid with energy or waste heat from other components of the gas turbine system 10 or from external systems or processes. For example, in certain embodiments, waste heat from the exhaust gas 21, or from other waste heat sources within the system 10, may be utilized to increase a temperature and/or pressure of a supply of fluid (e.g., steam, air, compressed air, inert gas) to generate the pressurized fluid 50. In certain embodiments, the external pressurized fluid supply 52 may be configured to modify the pressure and/or temperature of the pressurized fluid 50 based on the operating parameters of the gas turbine system 10, or based on desired operating parameters of the gas turbine system 10. For example, the external pressurized fluid supply 52 may be configured to adjust the pressure of the pressurized fluid 50 to a target pressure or within upper and lower pressure thresholds based on an injection location in the turbine 20 (e.g., expected or actual pressure at a particular turbine nozzle 35 or turbine stage 38). By further example, the external pressurized fluid supply 52 may be configured to adjust the temperature of the pressurized fluid 50 to a target temperature or within upper and lower temperature thresholds based on an injection location in the turbine 20 (e.g., expected or actual temperature at a particular turbine nozzle 35 or turbine stage 38).

It should be noted that in certain embodiments, one or more independent shafts 24 may be disposed along the main flow path 55 of one or more turbine sections. Specifically, each of the one or more shafts 24 may be coupled aerodynamically and without any mechanical coupling, thereby allowing each shaft 24 to rotate at an independent shaft speed. Further, one or more flow control areas 12 may be disposed along the main flow path 55 in between each of the one or more independent shafts 24. In such embodiments, the external pressurized fluid supply 52 may be configured to supply the pressurized fluid 50 into each of the one or more flow control areas 12 through one or more fluid injection ports disposed along an outer wall (e.g., turbine casing and/or shroud segments) surrounding the main flow path 55, an inner wall or hub along the main flow path 55, along one or more radial structures (e.g., stator vanes 36 and/or struts 48) in each turbine nozzle 35, or any stationary (e.g., non-rotating) surface along the main flow path of combustion gases. The fluid injection ports enable the fluid-actuated variable flow control system 11 to modulate and adjust the effective area 54 of each of the one or more flow control areas 12 disposed in between the one or more independent shafts 24.

In certain embodiments, a controller 56 (e.g., electronic controller) may be configured to dynamically control (e.g., increase and/or decrease) the amount of pressurized fluid 50 routed to each flow control area 12 along the main flow path 55 through the turbine 20. For example, the controller 56 may be configured to open or close a valve 58 (e.g., flow control valve) via one or more control signals to regulate the flow rate, the shaft speed, the quantity, or any other operating parameter of the pressurized fluid 50 routed along a fluid supply conduit 51 from the external pressurized fluid supply 52 to each flow control area 12. As a further example, the controller 56 may be configured to vary other operating parameters of the pressurized fluid 50 (e.g., pressure, temperature, and/or fluid composition) based on the operating parameters of the gas turbine system 10. In addition, the controller 56 may receive signals from one or more sensors 60 disposed in the turbine 20 or throughout the gas turbine system 10, such as, but not limited to, pressure sensors, temperature sensors, flow rate sensors, shaft speed sensors, fluid composition sensors, exhaust emissions sensors (e.g., carbon oxides, nitrogen oxides, sulfur oxides, unburnt fuel, and/or particulate matter), and vibration sensors. Specifically, the sensors 60 may be configured to gather information related to an operating parameter of the pressurized fluid 50, the hot combustion gases 18, the flow control area 12, changes across the turbine 20 (e.g., from inlet to outlet, from stage to stage, or both), and/or a variety of other operating parameters of the gas turbine system 10. For example, information related to a temperature, a pressure, a flow rate, a shaft speed, a quantity, or a fluid composition of the combustion gases 18 may be gathered by the sensors 60. In certain embodiments, one or more sensors 60 may be disposed within the combustor 13, and may be configured to gather information related to combustion dynamics within the combustor 13, such as information related to an amount or a flow of combustion gases 18 produced, an exhaust composition, a fuel composition, a fuel temperature, a pressure, or any other parameter related to combustion dynamics.

In certain embodiments, the controller 56 may adjust a parameter (e.g., pressure, temperature, flow rate, shaft speed, quantity, composition, etc.) of the pressurized fluid 50 routed to each flow control area 12 based on the signals received from the sensors 60. For example, the controller 56 may adjust the pressure of the pressurized fluid 50 routed to each flow control area 12 based on pressure feedback from the sensors 60, such that the pressure of the pressurized fluid 50 is greater than, equal to, or less than a pressure threshold, or between upper and lower pressure thresholds. The pressure thresholds may be based on the sensor 60 feedback in the vicinity of the flow control area 12, such that the injection pressure of the pressurized fluid 50 is substantially matched with the pressure of the hot combustion gases 18 flowing through the flow control area 12.

In certain embodiments, the controller 56 may open (or increase an opening of) the valve 58 to increase the pressurized fluid 50 into the flow control area 12, thereby reducing the effective area 54 through which the combustion gases 18 can flow through the turbine 20 and decreasing the flow of the combustion gases 18. Likewise, the controller 56 may close (or decrease an opening of) the valve 58 to decrease the injection of the pressurized fluid 50 into the flow control area 12, thereby increasing the effective area 54 through which the combustion gases 18 can flow through the turbine 20 and increasing the flow of the combustion gases 18. In this manner, the controller 56 selectively modulates the effective area 54 of the flow control area 12 by controlling (e.g., increasing or decreasing) the injection of the pressurized fluid 50 into the flow control area 12 (e.g., simulating a physical geometrical change in the actual area 53), thereby controlling (e.g., increasing or decreasing) the flow of combustion gases 18 that pass through the flow control area 12 of the turbine 20. Further, controlling the fluid injection into the flow control area 12 to control the flow of the combustion gases 18 helps to reduce or eliminate the use of any moving structures (e.g., vanes) to adjust the geometry along the main flow path 55.

In certain embodiments, the controller 56 may include various components to control the pressurized fluid 50 routed to the flow control area 12. For example, the controller 56 may include a processor 62 and a memory 64. Further, in certain embodiments, the controller 56 may include a hardware interface for interacting with the sensors 60, the valves 58, and/or various other components of the system 10. As depicted, the processor 62 and/or other data processing circuitry may be operably coupled to memory 64 to retrieve and execute instructions for monitoring and controlling the system 10. For example, these instructions may be encoded in programs or software that are stored in memory 64, which may be an example of a tangible, non-transitory computer-readable medium, and may be accessed and executed by the processor 62 to allow for the presently disclosed techniques to be performed. The memory 64 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 64 as described above.

Figure 2:
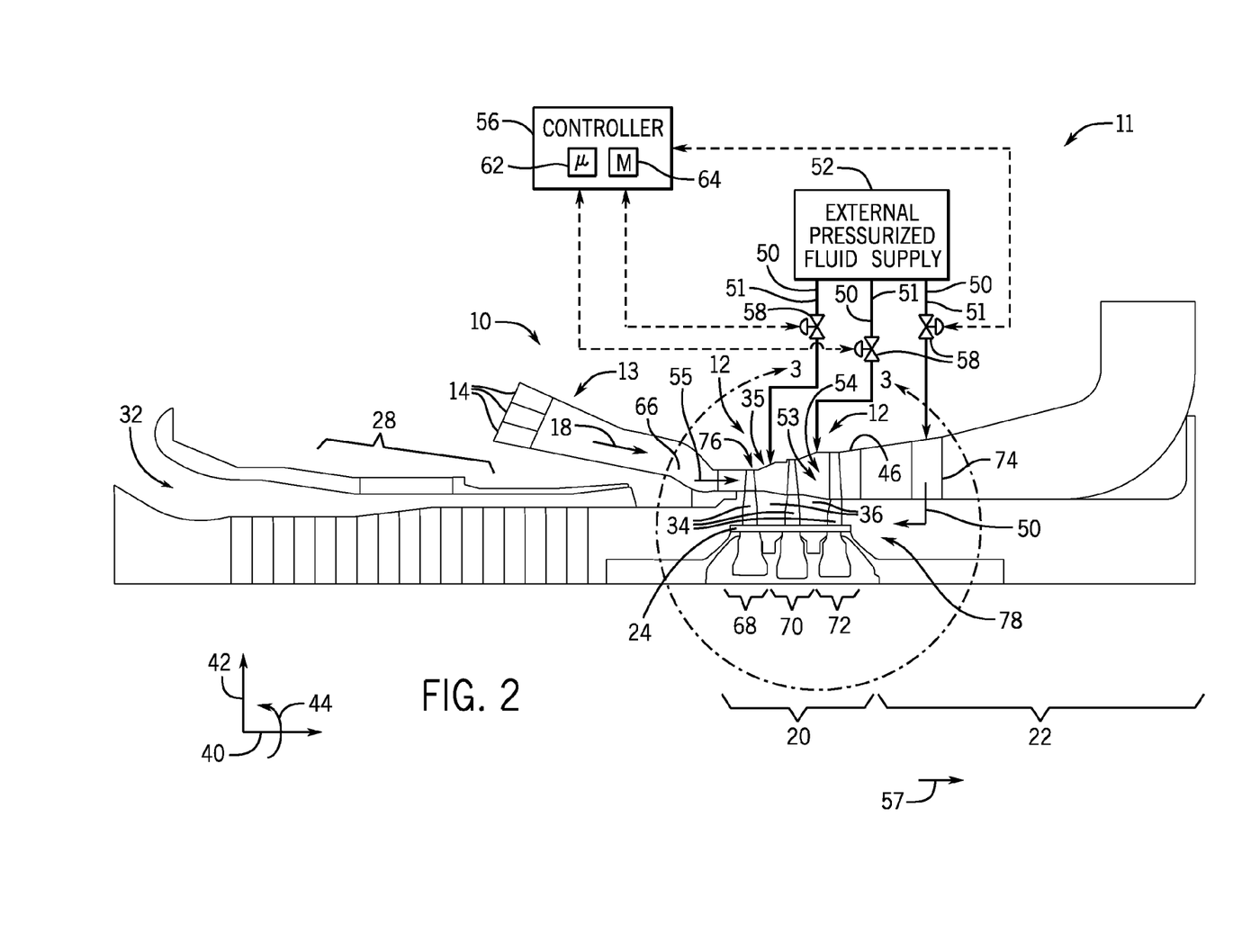
FIG. 2 is a schematic cross-sectional side view of an embodiment of the gas turbine system of FIG. 1, illustrating a pressurized fluid routed from the external fluid supply to a flow control passage within the turbine.

FIG. 2 is a cross-sectional side view of an embodiment of the gas turbine system 10 along the longitudinal axis 40, further illustrating the fluid-actuated variable flow control system 11. The gas turbine system 10 includes one or more combustors 13 that may be disposed in an annular arrangement about the longitudinal axis 40. As noted above, air enters through the air intake section 32 and is compressed by the compressor 28. The compressed air 16 from the compressor 28 is then directed into the combustor 13, where the compressed air 16 is mixed with the fuel 15. The mixture of the compressed air 16 and the fuel 15 is generally burned within the combustor 13 to generate high-temperature, high-pressure combustion gases 18, which are used to generate torque within turbine 20. Specifically, each combustor 13 may include a transition piece 66 that directs the hot combustion gases 18 from the combustor 13 and into the turbine 20. In particular, each transition piece 66 may generally define a main flow path 55 for the hot combustion gases 18 from the combustor 13 to one or more turbine stages 38 of the turbine 20.

For example, in the illustrated embodiment, the turbine 20 includes three separate stages 68, 70, and 72. In other embodiments, the turbine 20 may include any number of turbine stages 38, such as 1, 2, 3, 4, 5, 6, 7, 8, 9, 10, or more turbine stages 38. Each stage 68, 70, and 72 may include a plurality of turbine blades 34 rotatably coupled to the shaft 24. Each stage 68, 70, and 72 also includes a turbine nozzle 35 having one or more stator vanes 36 disposed upstream of each set of turbine blades 34. The stator vanes 36 direct the hot combustion gases 18 toward the turbine blades 36, where the hot combustion gases 18 apply motive forces to the turbine blades 34 to rotate the turbine blades 34, thereby turning the shaft 24. The hot combustion gases 18 flow through each of the stages 68, 70, and 72 along the main flow path 55 applying motive forces to the blades 34 within each stage 68, 70, and 72. The hot combustion gases 18 may then flow in the downstream direction 57 to exit the turbine 20 and enter the exhaust section 22. The exhaust section 22 may reduce the velocity of fluid flow through the exhaust section 22 while also increasing the static pressure to reduce the work of the gas turbine system 10. In certain embodiments, the exhaust section 22 includes a stationary strut 74 disposed between the walls of the exhaust section 22 (e.g., exhaust conduit). The strut 74 may hold the walls of the exhaust section 22 in a fixed relationship to another and/or provide structural support to the exhaust section 22. Any number of struts 74 (e.g., 0, 1, 2, 3, 4, 5, 6, 7, 8, 9, 10, or more) may be utilized within the exhaust section 22.

As noted above, in certain embodiments, the pressurized fluid 50 from the pressurized fluid supply 52 may be routed into the flow control area 12 of the turbine 20 to modulate and/or adjust the effective area 54 of the flow control area 12. Specifically, one or more flow paths of the pressurized fluid 50 may be routed to one or more fluid injection ports (e.g., openings or outlets) in one or more structural components of the turbine 20, wherein the structural components may include any structure (e.g., wall, vane, strut, hub, shroud, etc.) in direct contact with the main flow path 55. For example, in certain embodiments, a flow of the pressurized fluid 50 may be routed from the external pressurized fluid supply 52 to each of one or more turbine nozzles 35 and/or stator vanes 36, and may be injected through one or more openings disposed in the turbine nozzles 35 and/or stator vanes 36 into the flow control area 12 of the turbine 20. Specifically, in certain embodiments, the pressurized fluid 50 may be routed to each turbine nozzle 35 and/or stator vane 36 through an outer cavity 76, an inner cavity 78, and/or a stationary strut 74 of the turbine 20, as further described with respect to FIG. 3. For example, the pressurized fluid 50 may be routed to each turbine nozzle 35 and/or stator vane 36 through the outer cavity 76, or through the stationary strut 74 and the inner cavity 78, or a combination thereof.

Figure 3:
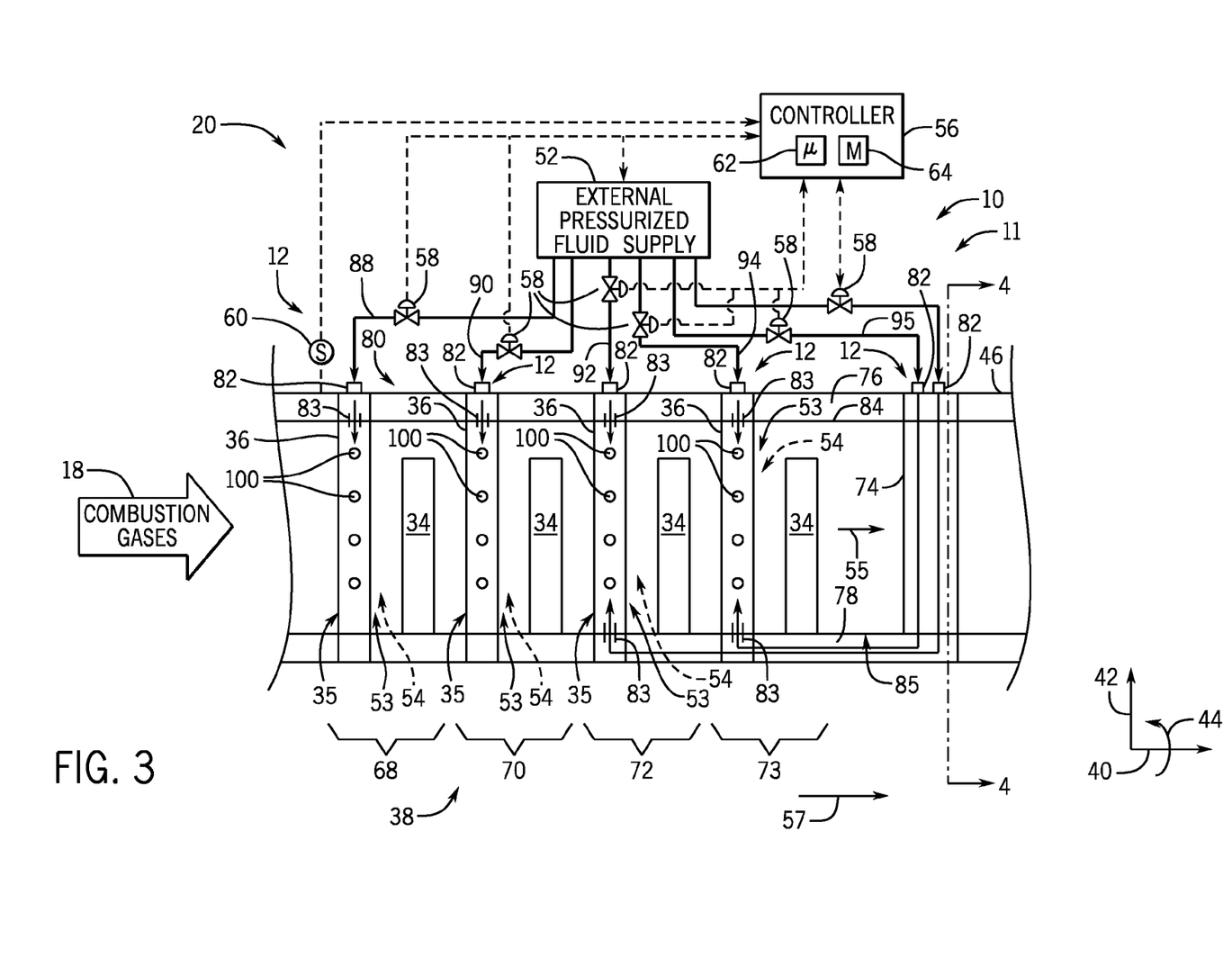
FIG. 3 is a schematic cross-sectional side view of an embodiment of the external fluid supply system of FIG. 1 taken within line 3-3, further illustrating a pressurized fluid routed to the flow control passage of the turbine through an outer cavity and an inner cavity.

FIG. 3 is a schematic view of an embodiment of the fluid-actuated variable flow control system 11 having the external pressurized fluid supply 52 of FIG. 1, further illustrating one or more flows of the pressurized fluid 50 routed to the flow control areas 12 of the turbine 20 through the outer cavity 76 and the inner cavity 78 of the turbine 20. Specifically, in certain embodiments, each turbine stage 38, such as the turbine stages 68, 70, 72, or 73, may include a combination of a turbine nozzle 35 with a set of stator vanes 36 (e.g., 1 to 100 or more) and a set of turbine blade 34 (e.g., 1 to 100 or more). In each stage 38, the turbine nozzle 35 with stator vanes 36 may be disposed upstream of the turbine blades 34, and each of the one or more stator vanes 36 of the turbine nozzle 35 may be configured to direct the combustion gases 18 towards the turbine blade 34 along the main flow path 55. Further, as noted above, the hot combustion gases 18 apply motive forces to the blades 34 to rotate the blades 34, thereby turning the shaft 24. The hot combustion gases 18 flow through each of the turbine stages 38 applying motive forces to the turbine blades 34 within each stage 68, 70, 72. Accordingly, the hot combustion gases 18 flow along the main flow path 55 in the downstream direction 57 through one or more turbine stages 38, and pass through each flow control area 12, turbine nozzle 35 with stator vanes 36, and turbine blades 34 within each of the one or more turbine stages 38.

In certain embodiments, one or more flows of the pressurized fluid 50 may be routed to each turbine nozzle 35, stator vane 36, and/or hot wall 84 through the turbine casing 46 and an outer cavity 76 (e.g., outer annular cavity) of the turbine 20. The outer cavity 76 may be defined by a first wall 80 (e.g., outer wall, exterior surface, or casing wall) disposed about a second wall 84 (e.g., hot wall, inner wall, interior surface, or shroud), wherein the second wall 84 is disposed about the main flow path 55 of the combustion gases 18. Specifically, the pressurized fluid 50 is provided from the wall 80 of the turbine casing 46 in the radial direction 42 towards the flow control area 12. In certain embodiments, one or more external inlets 82 (or conduits) disposed in the wall 80 of the turbine casing 46 may be fluidly coupled with the stator vanes 36, which include one or more fluid injection ports 100 (e.g., apertures, openings, or outlets). Further, the external inlets 82 may route the received pressurized fluid 50 into the outer cavity 76 of the turbine 20. In certain embodiments, one or more fluid injection ports 83 (e.g., apertures, openings, or outlets) disposed in the wall 84 of the outer cavity 76 may route the pressurized fluid 50 into the stator vanes 36 and/or directly into the flow control area 12, as further described with respect to FIG. 5.

In certain embodiments, one or more flows of the pressurized fluid 50 may be routed to each turbine nozzle 35, stator vane 36, and/or hot wall 85 through the stationary strut 74 and through an inner cavity 78 of the turbine 20. Specifically, the pressurized fluid 50 may be provided from the wall 80 of the turbine casing 46 in the radial direction 42 towards the inner cavity 78. For example, one or more external inlets 82 disposed in the wall 80 of the turbine casing 46 may be fluidly coupled with one or more stationary struts 74. Further, the external inlets 82 may route the received pressurized fluid 50 into the stationary strut 74 and route the pressurized fluid 50 towards the inner cavity 78 of the turbine 20. One or more fluid ports 83 disposed on a wall 85 (e.g., hot wall, hub, or inner surface) of the inner cavity 76 and aligned with the stator vanes 36 may route the pressurized fluid 50 into the stator vanes 36, as further described with respect to FIG. 5. Additionally, in certain embodiments, the one or more fluid ports 83 may route the pressurized fluid 50 from the inner cavity 78 directly into the flow control area 12, as further described with respect to FIG. 5. Indeed, the stationary strut 74 may be utilized as a passageway to route one or more individual flows of the pressurized fluid into the inner cavity 78, such that the pressurized fluid 50 is routed from the inner cavity 78 in the radial direction 42 towards the flow control area 12. As further described with respect to FIG. 5, one or more fluid injection ports 100 on each stator vane 36 route the pressurized fluid 50 from the stator vane 36 and into the flow control area 12.

As noted above, in certain embodiments, the controller 56 may modulate or control the effective area 54 of the flow control area 12 by controlling the injection of the pressurized fluid 50 into the flow control area 12, e.g., from each turbine nozzle 35, stator vane 36, and/or hot wall 84, 85 along the main flow path 55. The controller 56 may route pressurized fluid 50 to each turbine stage 38 via each turbine nozzle 35, stator vane 36, and/or hot wall 84, 85 based on feedback received from one or more sensors 60 disposed throughout the gas turbine system 10, such as along the main flow path 55 of the combustion gases 18. In certain embodiments, the controller 56 may be configured to adjust a parameter (e.g., pressure, temperature, flow rate, shaft speed, quantity, composition, etc.) of the pressurized fluid 50 routed to the flow control area 12 based on the signals received from the sensors 60. Accordingly, the controller 56 may be configured to dynamically limit or control various parameter of the pressurized fluid 50 routed into the flow control area 12. In some situations, the controller 56 may increase a flow or a supply of the pressurized fluid supply 50 into the flow control area 12 to reduce the effective area 54, thereby reducing or constricting the flow of the combustion gases 18 along the main flow path 55. Likewise, in some situations, the controller 56 may reduce a flow or a supply of the pressurized fluid supply 50 into the flow control area 12 to increase the effective area 54, thereby increasing the flow of the combustion gases 18 along the main flow path 55. In particular, it should be noted that the controller 56 may be configured to dynamically control the effective area 54 of the flow control area 12 to improve the efficiency of the gas turbine system 10. Specifically, the controller 56 may adjust or modulate the effective area 54 of the flow control area 12 to control the pressure ratio and/or the flow ratio of the combustion gases 18 between the inlet and the outlet of the turbine 20. Further, controlling the pressure ratio and/or the flow ratio in this manner may control a speed of the turbine 20, thereby improving the efficiency of the gas turbine system 10.

In certain embodiments, the controller 56 may modulate or control the effective area 54 of the flow control area 12 proximate to each turbine stage 38 by controlling the injection of the pressurized fluid 50 into the turbine nozzle 35, stator vane 36, and/or hot wall 84, 85 of each turbine stage 38. For example, the turbine nozzle 35, stator vane 36, and/or hot wall 84, 85 at each turbine stage 38 may receive a separate flow of the pressurized fluid 50 from the external pressurized fluid supply 52. Specifically, in the illustrated embodiment, the turbine nozzle 35, stator vane 36, and/or hot wall 84, 85 of the first turbine stage 68 may receive a first flow 88 of pressurized fluid 50; the turbine nozzle 35, stator vane 36, and/or hot wall 84, 85 of the second turbine stage 70 may receive a second flow 90 of pressurized fluid 50; the turbine nozzle 35, stator vane 36, and/or hot wall 84, 85 of the third turbine stage 72 may receive a third flow 92 of pressurized fluid 50; and the turbine nozzle 35, stator vane 36, and/or hot wall 84, 85 of the fourth turbine stage 73 may receive a fourth flow 94 of pressurized fluid 50. It should be noted that in certain embodiments, the controller 56 may be configured to regulate the parameters of the pressurized fluid 50 provided to a particular turbine nozzle 35, stator vane 36, and/or hot wall 84, 85 through the inner cavity 78 and the outer cavity 76, such that the turbine nozzle 35, stator vane 36, and/or hot wall 84, 85 receives pressurized fluid 50 with similar parameters through the inner cavity 78 and the outer cavity 80. Accordingly, in the illustrated embodiment, the turbine nozzle 35, stator vane 36, and/or hot wall 84, 85 of the fourth turbine stage 73 may receive a fifth flow 95 of pressurized fluid 50 that is substantially similar to the fourth flow 94 of the pressurized fluid 50.

In certain embodiments, the controller 56 may be configured to dynamically control or limit a parameter of each flow (e.g., the first flow 88, the second flow 90, the third flow 92, or the fourth flow 94, etc.) of the pressurized fluid 50 to each turbine stage 38. For example, the controller 56 may be configured to regulate or control a pressure, a flow rate, a shaft speed, a flow, a quantity of flow, a composition, a temperature, or a combination thereof, of each flow of the pressurized fluid 50 routed to each turbine nozzle 35, stator vane 36, and/or hot wall 84, 85 at each stage 38 of the turbine 20. Accordingly, in some situations, the controller 56 may adjust the pressure of the first flow 80 of the pressurized fluid 50 to be different from the second flow 82 of the pressurized fluid 50 to independently control the flow control areas 12 of the first and second turbine stages 68, 70. As a further example, the controller 56 may be configured to open or close one or more valves 58 via one or more control signals to adjust the flow rate of the pressurized fluid 50 to the turbine nozzle 35, stator vane 36, and/or hot wall 84, 85 of each turbine stage 38 to control the flow control area 12 of each turbine stage 38 independently.

Figure 4:
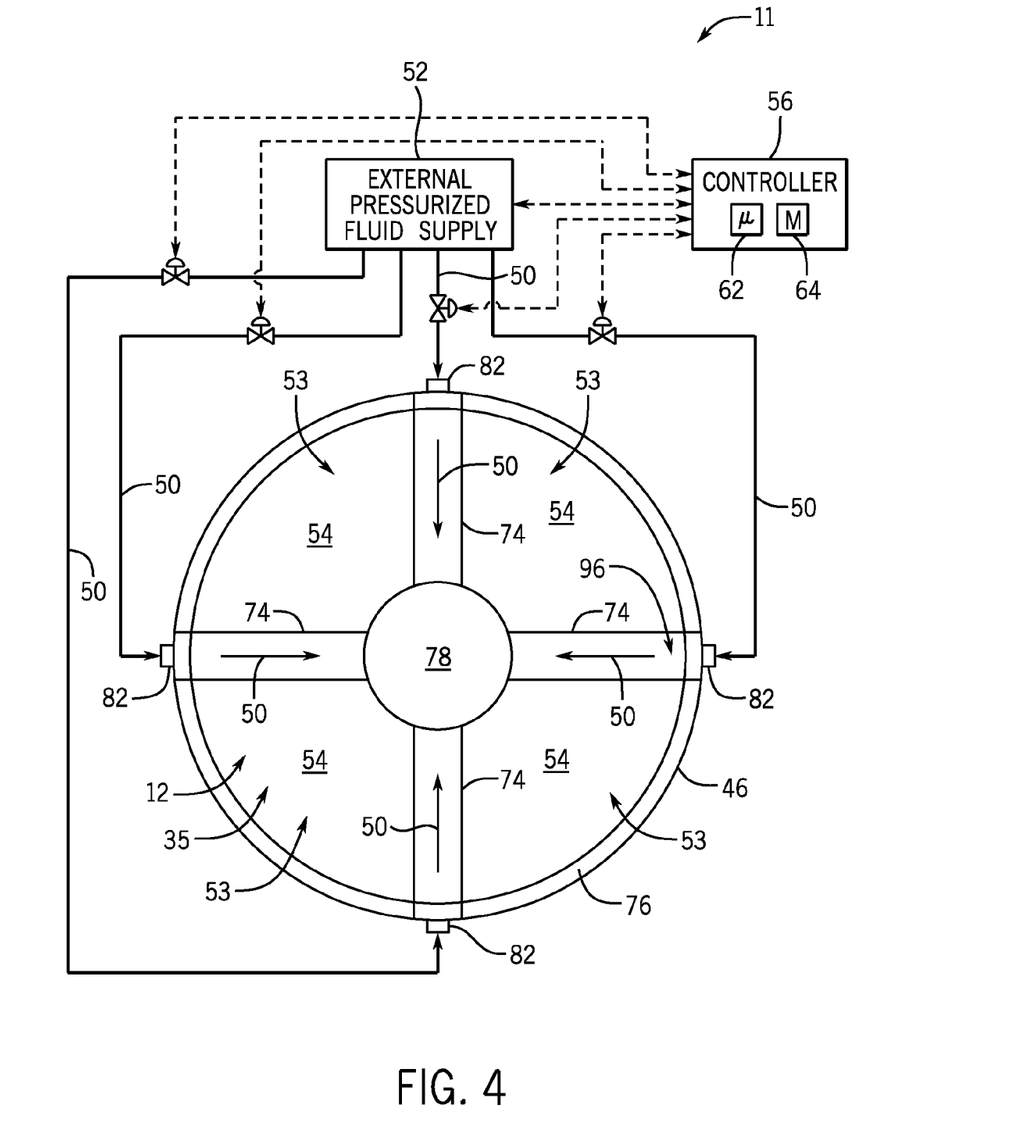
FIG. 4 is a schematic cross-sectional view of an embodiment of the turbine of FIG. 3 taken along line 4-4, further illustrating injecting the pressurized fluid through a stationary strut and the inner cavity.

FIG. 4 is a cross-sectional schematic view of an embodiment of the fluid-actuated variable flow control system 11 of the turbine 20 of FIG. 3, further illustrating injection of the pressurized fluid 50 through a set of stationary struts 74 (e.g., four struts) and the inner cavity 78. As noted above, in certain embodiments, the pressurized fluid 50 may be routed to each turbine nozzle 35, stator vane 36, and/or hot wall 85 at one or more stages 38 through one or more stationary struts 74. Specifically, the external inlets 82 may be aligned with and fluidly coupled to the stationary struts 74 and may route the pressurized fluid 50 through the turbine casing 46 to inner strut channels 96. The stationary struts 74 may be configured to route one or more flows of the pressurized fluid 50 through the inner strut channels 96 and to the inner cavity 78. Further, as noted above with respect to FIG. 3, one or more flows of the pressurized fluid 50 may be routed from the inner cavity 78 and into each turbine nozzle 35, stator vane 36, and/or hot wall 85 at one or more stages 38 of the turbine 20. In this manner, the pressurized fluid 50 may be routed to the turbine nozzle 35, stator vanes 36, and/or hot wall 85 via the inner cavity 78 in the radial direction 42 towards the flow control area 12, such that the turbine nozzle 35, stator vanes 36, and/or hot walls 84, 85 receive the pressurized fluid 50 from both the outer casing wall 80 and the inner wall 84 of the turbine 20.

Figure 5:
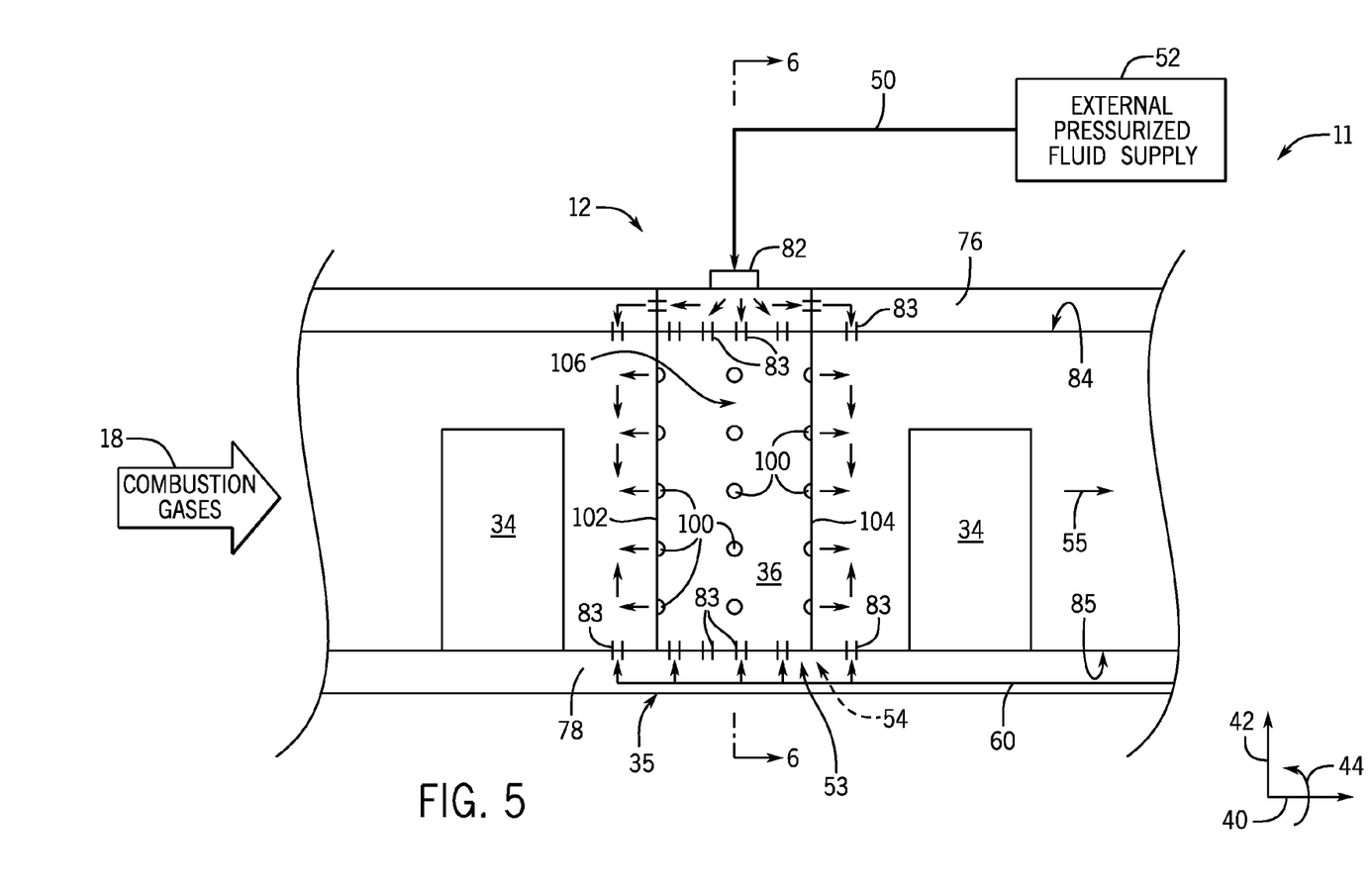
FIG. 5 is a schematic cross-sectional side view of an embodiment of the external fluid supply of FIG. 3, illustrating injection of the pressurized fluid through one or more fluid ports disposed on each of the one or more stator vanes.

FIG. 5 is a detailed schematic view of an embodiment of the fluid-actuated variable flow control system 11 having the external pressurized fluid supply 52 of FIG. 3, illustrating injection of the pressurized fluid 50 from one or more fluid injection ports 100 disposed on each of the one or more stator vanes 36 and into the flow control area 12. The fluid injection ports 100 may be disposed along a leading edge 102, a trailing edge 104, or a central portion 106 between the leading and trailing edges 102 and 104 of each stator vane 36. Furthermore, the fluid injection ports 100 may be disposed on both sides of each stator vane 36. As a result, the fluid injection from the ports 100 may be oriented in an upstream axial direction, a downstream axial direction, and opposite circumferential directions. Each stator vane 36 may have any suitable number, size, shape, and distribution of ports 100, such as between 1 to 1000, 5 to 500, 10 to 100, or 20 to 50 ports 100. The ports 100 may have a uniform or non-uniform size, a uniform or non-uniform distribution or spacing, a uniform or non-uniform shape (e.g., circular, oval, rectangular, etc.), or any combination thereof. As noted above, in certain embodiments, the pressurized fluid 50 may be routed to each stator vane 36 through the outer cavity 76 and the inner cavity 78 of the turbine 20. For example, the pressurized fluid 50 may be routed through the external inlet 82 disposed on the turbine casing 46 and into the outer cavity 76 of the turbine 20. Further, the pressurized fluid 50 may be routed through the stationary strut 74 and into the inner cavity 78 of the turbine 20.

As noted above, in certain embodiments, one or more fluid ports 83 disposed on the wall 84 of the outer cavity 76 and the wall 85 of the inner cavity 78 may route the pressurized fluid 50 into the stator vanes 36. In particular, the pressurized fluid 50 is injected into the flow control area 12 of the turbine 20 via the one or more fluid injection ports 100 disposed on the stator vane 36. In this manner, the pressurized fluid 50 injected into the flow control area 12 may create a film on surfaces of the stator vane 36 and may additionally expand into the flow control area 12. In certain embodiments, the one or more fluid ports 83 in the hot walls 84, 85 may route the pressurized fluid 50 from the inner cavity 78 and/or outer cavity 76 directly into the flow control area 12. The fluid ports 83 may be positioned at or upstream from the leading edge 102 of each stator vane 36, at or downstream from the trailing edge 104 of each stator vane 36, and/or along the central portion 106 of each stator vane 36 (e.g., for injection into the stator vanes 36 and/or directly into the flow control area 12). Similar to ports 100, the walls 84, 85 may have any suitable number, size, and distribution of fluid ports 83, such as between 1 to 1000, 5 to 500, 10 to 100, or 20 to 50 fluid ports 83 associated with each flow control area 12. The fluid ports 83 may have a uniform or non-uniform size, a uniform or non-uniform distribution or spacing, a uniform or non-uniform shape (e.g., circular, oval, rectangular, etc.), or any combination thereof.

As noted above, injecting the pressurized fluid 50 into the flow control area 12 may reduce the effective area 54, thereby reducing or constricting the flow of the combustion gases 18 along the main flow path 55. Likewise, reducing the injection of the pressurized fluid supply 50 into the flow control area 12 may increase the effective area 54, thereby relaxing or increasing the flow of the combustion gases 18 along the main flow path 55.

Figure 6:
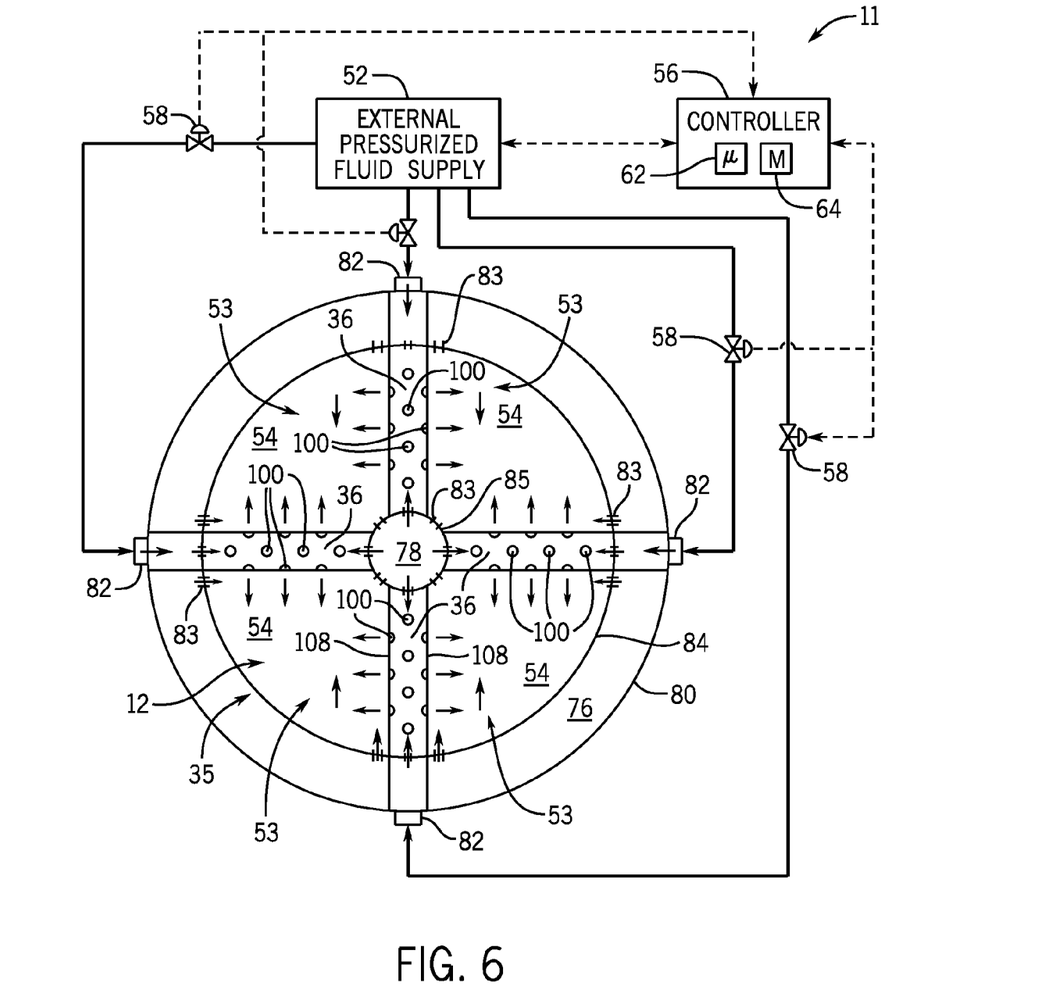
FIG. 6 is a schematic cross-sectional view of an embodiment of the turbine of FIG. 4 taken along line 6-6, illustrating injection of the pressurized fluid through the one or more fluid ports disposed on each of the one or more stator vanes.

FIG. 6 is a detailed schematic view of an embodiment of the fluid-actuated variable flow control system 11 having the external fluid supply 52 of FIG. 3, illustrating injection of the pressurized fluid 50 through the one or more fluid injection ports 100 disposed on each of the one or more stator vanes 36. As illustrated, the fluid injection ports 100 are disposed on opposite sides 108 of each stator vane 36 (e.g., along central portion 106), along the leading edge 102 of each stator vane 36, and along the trailing edge 104 of each stator vane 36. As a result, the fluid injection from the ports 100 may be oriented in an upstream axial direction, a downstream axial direction, and opposite circumferential directions. In certain embodiments, the ports 100 may be angled at an offset from a rotational axis of the turbine 20, thereby imparting a swirling motion or rotational motion to the fluid injected into the main flow path 55. The pressurized fluid 50 may be routed to each stator vane 36 through the outer cavity 76 and the inner cavity 78 of the turbine 20. Specifically, in certain embodiments, the pressurized fluid 50 may be routed through the fluid ports 83 and into the stator vanes 36 before being injected into each flow control area 12 of the turbine 20. In certain embodiments, the pressurized fluid 50 may be routed through the fluid ports 83 directly from the inner cavity 78 or the outer cavity 76 and into the flow control area 12. The fluid injection from the fluid ports 83 may be oriented in an inward radial direction from the hot wall 84 and an outward radial direction from the hot wall 85. In certain embodiments, the fluid ports 83 may be angled at an offset from a rotational axis of the turbine 20, thereby imparting a swirling motion or rotational motion to the fluid injected into the main flow path 55. Using each of these fluid injection locations, the pressurized fluid 50 may be provided from the external pressurized fluid supply 52 to the flow control area 12 of the turbine 20.

Technical effects of the disclosed embodiments include routing the pressurized fluid 50 from an external pressurized fluid supply 52 and into a flow control area 12 of the turbine 20. Specifically, the pressurized fluid 50 from the external pressurizing fluid supply 52 is routed from the external pressurized fluid supply 52 into the flow control area 12 via one or more fluid injection ports (e.g., ports 100 and/or fluid ports 83) of the turbine 20 to modulate and adjust the effective area 54 of the flow control area 12. For example, the pressurized fluid 50 may be routed from the external pressurized fluid supply 52 to the turbine nozzle 35, stator vanes 36, and/or hot walls 84, 85 via the outer cavity 76 and/or the inner cavity 78, and may be injected through one or more fluid injection ports 100 disposed on the stator vane 36 and/or fluid ports 83 in the walls 84, 85 into the flow control area 12. As a further example, the pressurized fluid 50 may be routed from the external pressurized fluid supply 52 to the flow control area 12 of the turbine 20 directly from the outer cavity 76 and/or the inner cavity 78, e.g., through fluid ports 83 in the hot walls 84, 85. The controller 56 may be configured to dynamically control the injection of the pressurized fluid 50 into the flow control area 12. For example, injecting the pressurized fluid 50 into the flow control area 12 may reduce the effective area 54, thereby reducing or constricting the flow of the combustion gases 18. Likewise, reducing the injection of the pressurized fluid 50 into the flow control area 12 may increase the effective area 54, thereby increasing the flow of the combustion gases 18. By controlling various parameters of the pressurized fluid 50 routed to the flow control area 12, the controller 56 may be configured to regulate the efficiency of the system 10. In particular, the use of fluid injection to control the effective area 54 of the flow control area 12 and to control the flow of the combustion gases 18 may substantially reduce or eliminate the use of any moving structures (e.g., adjustable vanes) to adjust the geometry of the main flow path 55.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine comprising a main flow path, a plurality of turbine blades and at least one shaft disposed along the main flow path, at least one flow control area disposed along the main flow path, and at least one fluid injection port fluidly coupled to the main flow path; and
   a fluid supply system fluidly coupled to the at least one fluid injection port, wherein the fluid supply system is configured to couple to a plurality of waste heat sources, and the fluid supply system is configured to selectively use one or more waste heat sources of the plurality of waste heat sources to supply a fluid to the at least one fluid injection port to adjust an effective area of the at least one flow control area.

2. The system of claim 1, comprising a controller having a memory storing instructions to control the selective use of the one or more waste heat sources to provide the supply of the fluid to the at least one fluid injection port to adjust the effective area of the at least one flow control area to vary a flow of working fluid through the at least one flow control area of the main flow path.

3. The system of claim 1, comprising the plurality of waste heat sources.

4. The system of claim 1, wherein at least one of the plurality of waste heat sources is external from a gas turbine system having the turbine, a combustor, and a compressor.

5. The system of claim 1, wherein a controller has instructions to adjust a parameter of the fluid supplied by the fluid supply system and instructions to adjust a valve that controls a flow of the fluid supplied by the fluid supply system, and the parameter comprises a pressure, a temperature, a fluid composition, or a combination thereof.

6. The system of claim 1, wherein a controller has instructions to control the selective use of the one or more waste heat sources of the plurality of waste heat sources to selectively adjust a parameter of each fluid flow of a plurality of fluid flows based on an injection location of each fluid flow into a different one of a plurality of flow control areas, the controller has instructions to control a valve along each fluid flow of the plurality of fluid flows, and the parameter comprises a pressure, a temperature, a fluid composition, or a combination thereof.

7. The system of claim 1, wherein the fluid supply system comprises an air supply, an inert gas supply, a carbon dioxide supply, or a combination thereof.

8. The system of claim 1, wherein the at least one fluid injection port is disposed on a turbine nozzle, a stator vane, a first wall disposed about the main flow path, a shroud above a turbine blade, a stationary surface disposed along the main flow path, an outer cavity disposed between the first wall and a surrounding second wall, an inner cavity disposed within a third wall disposed about a rotational axis of the turbine, a strut extending across the main flow path, or any combination thereof.

9. The system of claim 1, wherein the plurality of waste heat sources comprise at least two of a reactor, a gasifier, a syngas cooler, a gas treatment system, an air separation unit, a liquefaction system, or a gas turbine system having the turbine.

10. The system of claim 1, wherein the at least one flow control area comprises a plurality of flow control areas disposed in different stages of a plurality of stages of the turbine, wherein each flow control area of the plurality of flow control areas comprises at least one fluid injection port fluidly coupled to the main flow path.

11. The system of claim 1, wherein the turbine comprises a gas turbine, and wherein the gas turbine comprises one or more independent shafts fluidly coupled along the main flow path, and wherein the at least one flow control area is disposed along the main flow path and along the one or more independent shafts.

12. A system, comprising:
   a controller having a memory storing instructions to control a selective use of one or more waste heat sources of a plurality of waste heat sources to provide a supply of a fluid from a fluid supply system to at least one fluid injection port fluidly coupled to at least one flow control area along a main flow path of a turbine, wherein the controller has instructions to control the selective use of the one or more waste heat sources to adjust the supply of the fluid to adjust the effective area to vary a flow of working fluid through the at least one flow control area of the main flow path.

13. The system of claim 12, comprising the fluid supply system, wherein the fluid supply system comprises an air supply, an inert gas supply, a carbon dioxide supply, or a combination thereof.

14. The system of claim 12, comprising the turbine, wherein the at least one fluid injection port is disposed on a turbine nozzle, a stator vane, a wall disposed about the main flow path, a shroud above a turbine blade, a stationary surface disposed along the main flow path, or any combination thereof.

15. The system of claim 14, wherein the turbine comprises a gas turbine.

16. The system of claim 12, wherein the controller has instructions to control the selective use of the one or more waste heat sources of the plurality of waste heat sources comprising at least two of a reactor, a gasifier, a syngas cooler, a gas treatment system, an air separation unit, a liquefaction system, or a gas turbine system having the turbine.

17. The system of claim 12, wherein the controller has instructions to control the selective use of the one or more waste heat sources of the plurality of waste heat sources to selectively adjust a parameter of each fluid flow of a plurality of fluid flows based on an injection location of each fluid flow into a different one of a plurality of flow control areas, the controller has instructions to control a valve along each fluid flow of the plurality of fluid flows, and the parameter comprises a pressure, a temperature, a fluid composition, or a combination thereof.

18. A method, comprising:
flowing a working fluid along a main flow path through a turbine to drive a plurality of turbine blades disposed along the main flow path;
selectively using one or more waste heat sources of a plurality of waste heat sources to provide a supply of a fluid from a fluid supply system to at least one fluid injection port fluidly coupled to the main flow path; and
controlling the selective use of the one or more waste heat sources to provide the supply of the fluid to the at least one fluid injection port to adjust an effective area of the at least one flow control area.

19. The method of claim 18, wherein controlling the selective use of the one or more waste heat sources comprises using an external waste heat source external from a gas turbine system having the turbine, a combustor, and a compressor.

20. The method of claim 18, wherein the flow control area is disposed downstream from a final turbine stage of the turbine.

* * * * *